Dec. 24, 1963  J. L. CUNNINGHAM, SR., ETAL  3,115,165
WEIGHT REGULATION SYSTEM
Filed June 29, 1960  4 Sheets-Sheet 4

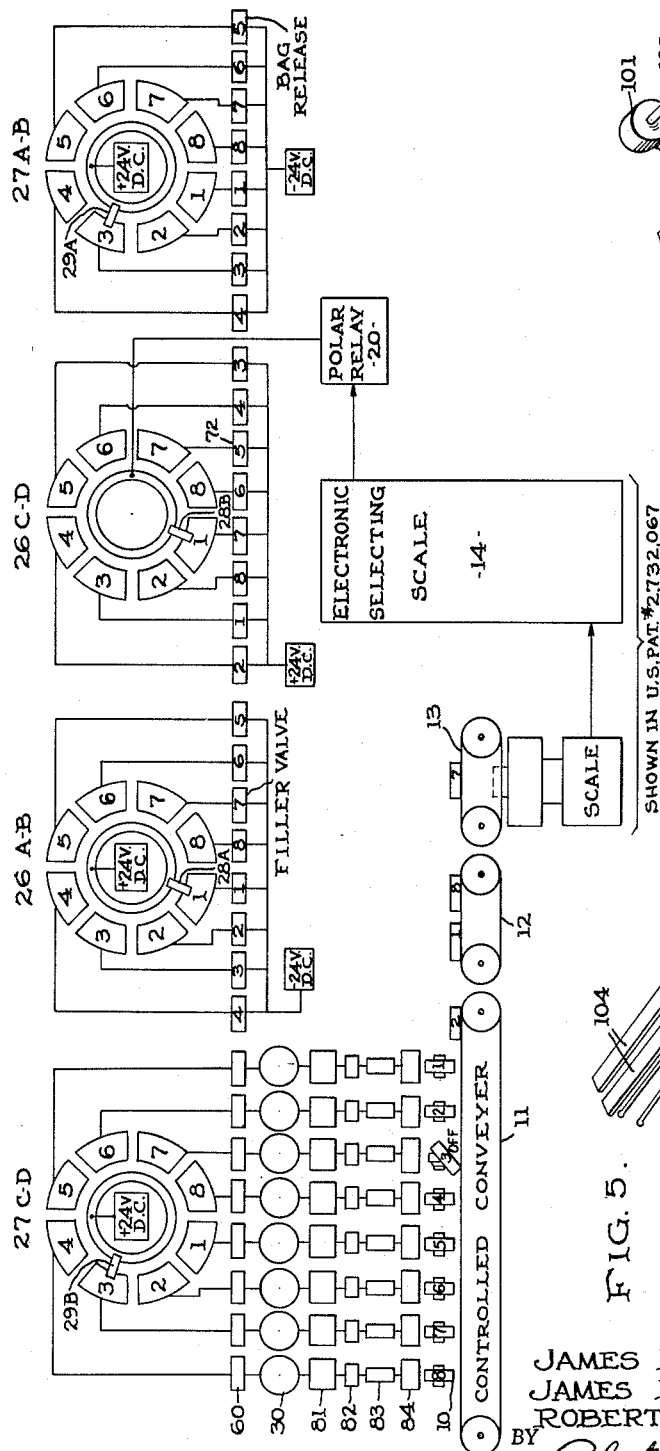

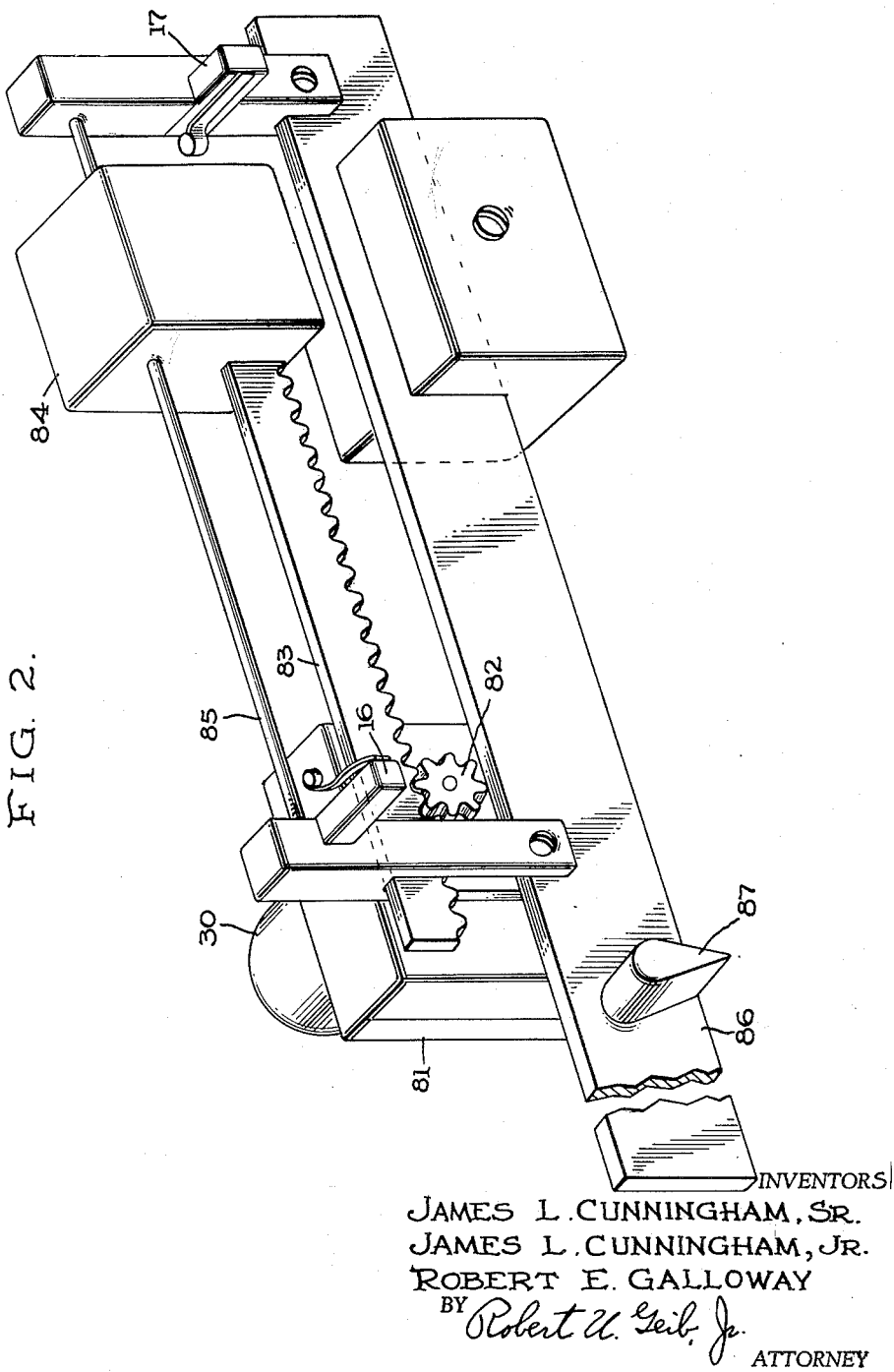
Dec. 24, 1963   J. L. CUNNINGHAM, SR., ETAL   3,115,165
WEIGHT REGULATION SYSTEM
Filed June 29, 1960   4 Sheets-Sheet 2
INVENTORS
JAMES L. CUNNINGHAM, SR.
JAMES L. CUNNINGHAM, JR.
ROBERT E. GALLOWAY
BY Robert U. Geib, Jr.
ATTORNEY

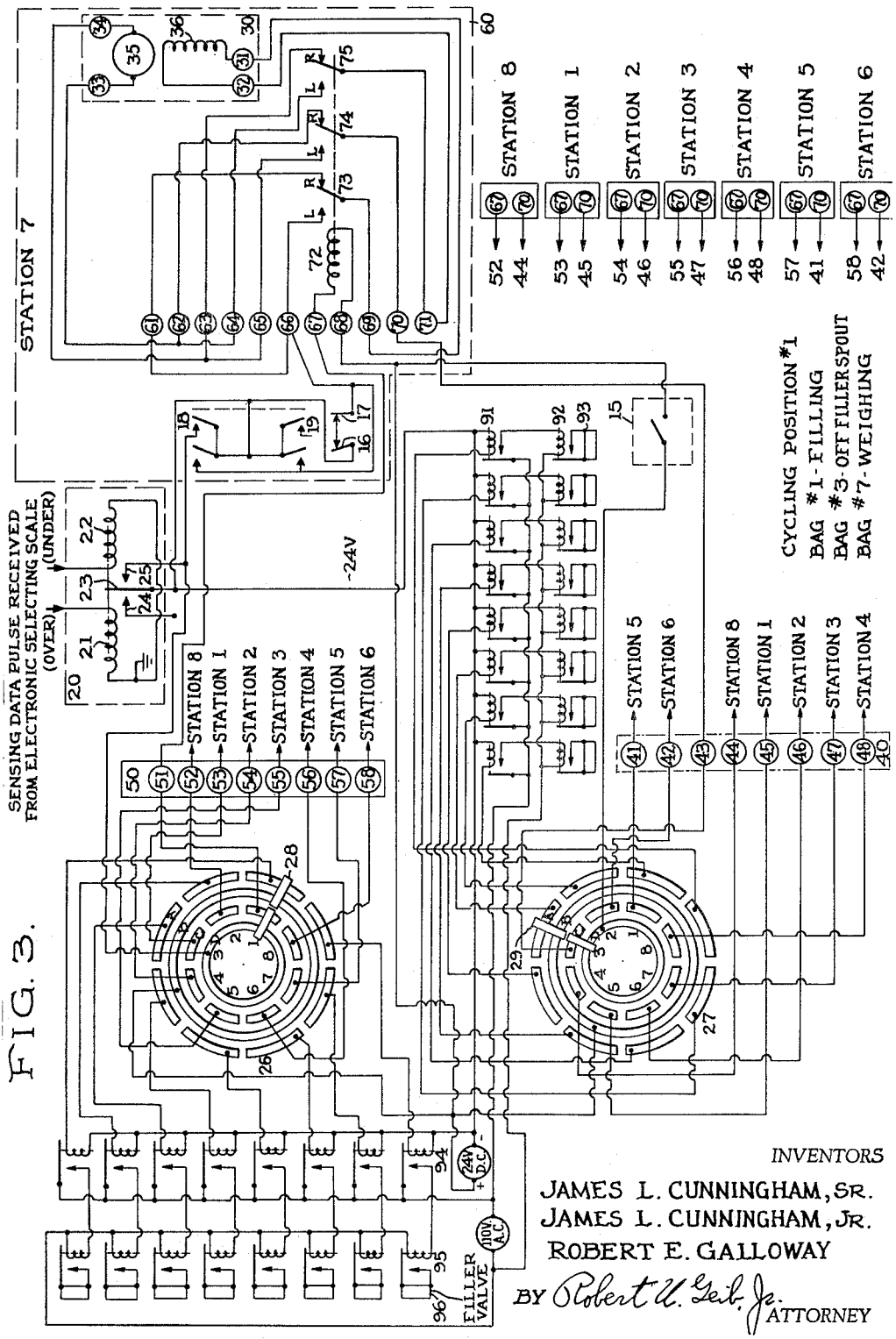

INVENTORS
JAMES L. CUNNINGHAM, SR.
JAMES L. CUNNINGHAM, JR.
ROBERT E. GALLOWAY
BY *Robert U. Seib Jr.*
ATTORNEY United States Patent Office 3,115,165
Patented Dec. 24, 1963

3,115,165
WEIGHT REGULATION SYSTEM
James L. Cunningham, Sr., and James L. Cunningham, Jr., both of Augusta, Ga., and Robert E. Galloway, Blythe, Ga.
Filed June 29, 1960, Ser. No. 39,586
17 Claims. (Cl. 141—83)

The present invention relates to a system for filling bags in sequence with a measured quantity of material based on weight, and more particularly to apparatus which will control the volume and hence the deposited weight of such materials as require precise weight-control to fill a bag.

In general the system samples each bag after it is filled to determine if its weight is within prescribed limits, overweight, or underweight.

As the filling time is hastened, as in an automatic bagging operation, it becomes increasingly difficult to pour the exact amount of a substance into a container. Many factors contribute to the inadequacies of the present day bulk packers or bag filling machines, such as density of the packaged material which cannot be maintained at a constant value; hygroscopic qualities of processed material allowing more or less moisture absorption which contribute to the final packaged weight; static charges of electricity which sometimes cause undue separation of materials and thus vary the quantity and weight which can be deposited in a container in a given amount of time; inertia of the mechanism used to control the rate-of-flow which may vary in time or motion; corrosive effects of some materials which may adversely affect the medium within which these materials are blown, sucked, or poured into the final containers; and physical pressure exerted upon the material to be packaged which varies with the physical weight of the material superimposed upon it before the packaging. These and other factors obviate the successful operation of present bag filling or box packing weighing devices. It is not possible to preset a weighing device to allow just exactly the predetermined amount of material, by weight or volume, to flow into the bag or container, constantly throughout the entire work cycle of the bagger or filler. Nor is it possible to adjust a bag filling apparatus of the conventional scale beam or weight system and have it consistently and continually thereafter deliver material of that exact weight to its packing system. It must be constantly adjusted to compensate for the factors mentioned above which disrupt the ideally selected and desirable rate of flow which allow precisely the right amount of material to be placed in the container.

Therefore, in view of the fact that there is no manner of adjustment which, when preset, will guarantee that a fixed weight can be consistently inserted in a series of containers under high speed production line conditions, this invention seeks to provide a novel approach to the problem.

Accordingly, the present invention is directed to a system whereby corrections will be applied automatically, constantly, and accurately to the bagger at the filling source.

Basically, the present invention provides a novel and improved controlled packaging mechanism wherein the control is exerted in small finite steps in order to allow precisely the exact amounts, within prescribed weight tolerances, to be placed in bags or other type containers. The bag-filler mechanism is fed correction signals at suitable intervals after an error in weight has occurred. Then, after the required small finite bits of correction have been made, the succeeding bags will hold exactly the required amount.

In this new system the final weighed output of each bag is held to very close tolerances, because with corrections being constantly applied, it is unnecessary to wait until a gross discrepancy causes the deposited weight to be considerably at variance with the norm. Each bag proceeding through the system of the present invention is weighed and if the bag is within accepted tolerances, it is passed on to the final production line. When a bag is detected as either over or under-weight, appropriate correction data is transmitted to the section of the bag-filler mechanism affected. The undesirable condition is thus corrected at the source within seconds after the occurrence of the discrepancy in weight.

Therefore, it is the object of this invention to provide a device which allows continuous, accurate and small finite corrections to be made to a bag-filling apparatus while this apparatus is in operation.

Also, it is an object of this invention to present an entirely new concept of bag filling which can be accomplished without the use of any scales or weighing device at the hopper or bin of the bag-filler apparatus.

Furthermore, it is an object of this invention to apply this new concept of bag filling to conventional present-day bag-filling apparatus so as to adjust, through the use of the novel apparatus in the present invention, even-balance scale beams or other similar type weighing apparatus so that the scale-beams control the deposit of material in containers through an accurate weight system.

It is a further object of this invention to apply the techniques and apparatus of the present invention to the filling of a container with an exact amount of material, time after time, by opening and closing a valve on a hopper, consistent with a time interval controlled by the present invention.

It is still another object of this invention to present a device which constantly evaluates the weights of deposited material in containers preceding the container being filled, and after a series of small adjustments, usually not more than three, the container being filled will then contain a specified volume by weight of the material being packaged.

By an appropriate choice of filling machines, the materials being weighed can also include liquid or semi-viscous material and therefore there should be no limitation on the type of material processed by this invention.

The above and other objects and advantages of the invention will become apparent upon full consideration of the following detailed description and accompanying drawings, in which:

FIG. 1 is a block diagram of a multispout bag-filler of the present invention used with counterpoise weight regulation apparatus;

FIG. 2 is a scale beam apparatus used with one embodiment of the invention;

FIG. 3 is a circuit diagram of the control circuitry used with an embodiment of the present invention;

FIGS. 4 and 5 illustrate a modification wherein cams are used with the present invention;

Figure 6:
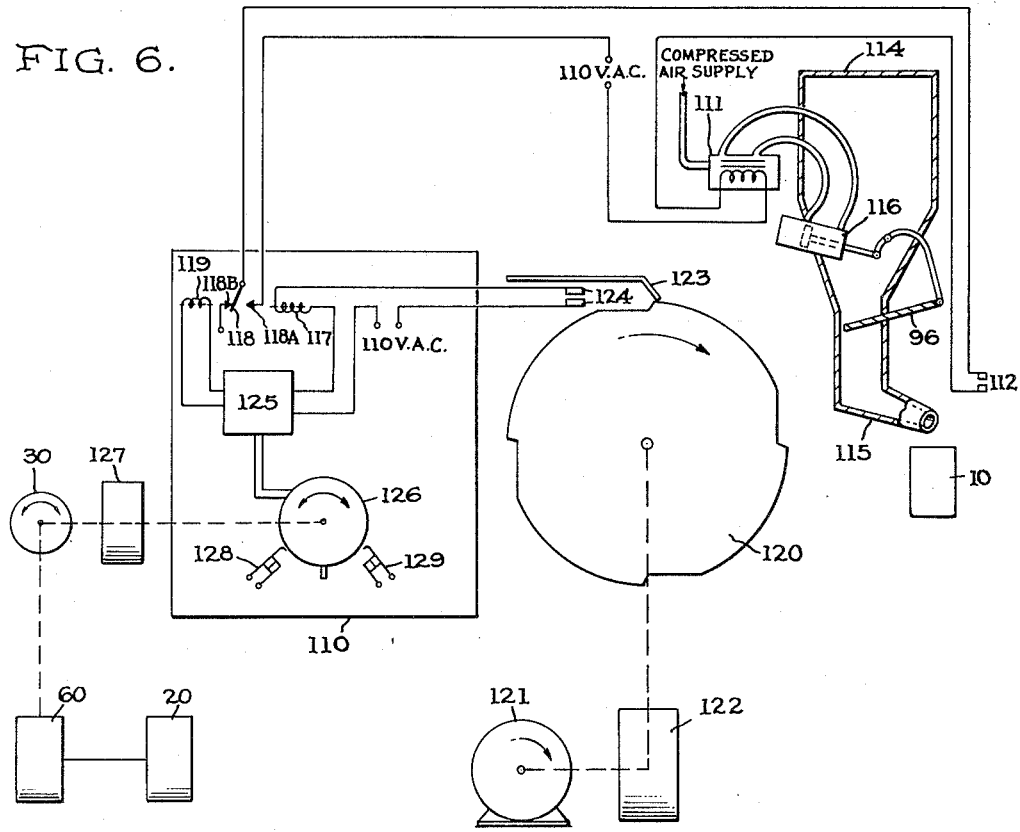
FIG. 6 is timing circuitry and apparatus used with another embodiment of the present invention.

Referring first to FIG. 1, there is illustrated a block diagram of an embodiment of the invention showing the overall system of checking the weight of the bagged material and correcting for any over or underweight packages. As shown in FIG. 1, the bags 10, when filled and released from their filling positions, are dropped onto a controlled conveyor 11 the speed of which is preset so as to prevent interference between bags dropping on it in order from the stations 1 through 8. The bag 10 is then moved on to feeder conveyor 12 and is then positioned on roller-conveyor scale 13, which is constructed so as to be rotatable. If the bag contains the required weight of material within set tolerances which is desired for this operation, the roller-conveyor scale 13 in combination with the electronic selecting scale 14, "accepts" the bag 10 and passes bag 10 on to a final conveyor (not shown) for proper disposition. However, if bag 10 is either over or underweight, then roller-conveyor scale 13 diverts bag 10 from the final conveyor and the sequence of operation of the system of this invention commences.

The operation and construction of the roller-conveyor scale 13 and companion electronic selecting scale 14 are not further described here, since any weighing and classifying apparatus which will emit a sensing data pulse designating over or underweight may be used with the weight regulation system of this invention. One such device which can be used with the novel system disclosed herein may be found in the disclosure of Letters Patent No. 2,732,067 to Cunningham, Sr., et al. Upon the detection of over or underweight of a bag by the apparatus found in the cited patent, the roller-conveyor 13 physically turns so as to send the rejected bag to a conveyor other than the one receiving correctly filled bags. This turning motion actuates a reject switch whose function will be explained in connection with the circuit diagram, FIG. 3, and simultaneously the electronic selecting scale 14 or a mechanical counterpart generates a sensing data pulse.

The system of this invention receives the data pulse in polar relay 20 which in turn activates circuitry through the commutators 26, 27 and commutator arm pieces 28A, 28B, 29A and 29B. The full circuitry will be explained in connection with FIG. 3, but the block diagram of FIG. 1 gives an overall view of the embodiment of the system utilizing commutator rings and counterpoise weight adjustment.

In FIG. 1 it can be seen that commutator arm pieces 28A, 28B, 29A and 29B close circuits through commutator rings 26A, 26B, 26C, 26D and 27A, 27B, 27C, 27D, allowing the different stations 1 through 8 to be activated to perform different designated functions. In construction, commutator arms 28 and 29 are each a two piece bar with the A and B sections insulated from each other and arms 28 and 29 rotating at a preset r.p.m. and always keeping the set 90° difference in position as shown in FIG. 1 and FIG. 3.

Commutator arm piece 28A with commutator rings 26A–B completes the circuit between the positive and negative 24 volt D.C. sources through a filler valve. With commutator arm piece 28A in the position shown, bag 10 in station 1 is in the process of being filled.

Commutator arm piece 29A with commutator rings 27A–B completes the circuit to release the bag 10 at station 3.

Commutator arm piece 28B closes a circuit to segment 1 on commutator ring 26C which is electrically connected to coil 72 of the control relay 60 at station 7 to allow any necessary weight correction to take place at the station from which a previously filled bag is now being weighed on roller-conveyor scale 13. This circuit must also be closed through polar relay 20 which receives the over or underweight data pulse from selecting scale 14.

Commutator arm piece 29B with commutator rings 27C–D in the position shown closes circuitry to segment 3 on the commutator ring 27C completing the circuit to station 7 thereby actuating control relay 60 at that station. The weighing regulation at that station is actuated as needed. The control relay 60, if necessary, operates reversible motor 30 which operates through reduction gear 81. The details of the connections of the counterpoise correction made at each station are shown in FIG. 2.

In FIG. 2, reversible motor 30 which has been actuated by means of circuitry which will be explained more fully in connection with the circuit diagram of FIG. 3, will rotate, for example, in a clockwise direction. Through reduction gearing 81 motor 30 will operate pinion gear 82 in a clockwise direction, thereby moving rack 83 and auxiliary poise weight 84 attached thereto, outward on scale beam 86 along guide rod 85. This physical re-positioning of auxiliary poise weight 84 changes the weight balance on beam pivot 87 and the bearing upon which it rests so that more material moves into the hopper at that station and thence into the bag being filled. When moved in the outward direction discussed above to correct for an underweight bag, the system anticipates additional flow of material resulting in a larger amount being packed in the bag 10 upon the next filling. Limit switches 16 and 17 are placed so as to limit the range of travel of auxiliary poise weight 84.

It should be noted that the invention need not be limited to use of rack 83, and pinion gear 82, since a threaded screw and worm gear or similar mechanism could be used for moving auxiliary poise weight 84 in conjunction with reversible motor 30. As shown in the block diagram of FIG. 1, there should be one each of the mechanism depicted in FIG. 2 for each of the bag-filler stations 1 through 8.

Referring now to FIG. 3, there is shown a circuit to operate the weight regulation system of this invention. The embodiment of the invention depicted here illustrates the system using a two unit commutator 26, 27 of four concentric slip-rings A, B, C and D divided into eight segments each and numbered 1 through 8. This is not to be considered as limiting the invention for other means for controlling each station separately such as the cam means illustrated in FIGS. 4 and 5 may also be used.

For the embodiment of the system illustrated in FIG. 3 there are two commutators 26 and 27 with each having four concentric rings divided into eight segments. Each segment is approximately 43° of arc with the remaining 2° used to separate each from the other. The rings A, B, C, D are lettered from the outside inward to the center ring. Rings D and B of both commutators 26 and 27 may be solid continuous rings, as shown in the figure, inasmuch as their connections are electrically equivalent to such a construction. Therefore, this leaves only rings A and C of commutators 26 and 27 to be divided into the precise 43° form. It is essential that upper commutator arm 28 and lower commutator arm 29 be in exact mechanical alignment with each other. For the case illustrated here, they should be in a 90° phase relationship. It is possible to alter the rotation cycle which affects the filling, dropping, and weighing of each of the eight bags 10 by changing the phase relationship of commutator arms 28 and 29.

The circuitry of FIG. 3 shows switch positions and connections with the weight regulation apparatus at the point in the cycle where bag No. 1 is being filled, bag No. 3 is being dropped on the conveyor 11 after having been filled, and bag No. 7 is being weighed to determine the accuracy of the apparatus in filling that bag.

When a filled bag 10 reaches the roller-conveyor scale 13, there are three possible conditions which may be found to be true. The bag 10 may weigh within the tolerances set up for the weight regulating apparatus and therefore no adjustment in weight will be necessary before the next bag is filled at that station. Secondly, the bag 10 may weigh below the tolerance set for the weight regulating apparatus and therefore a small adjustment is necessary in the auxiliary poise weight position so as to increase the weight of material a finite amount to the bag 10 which will next be filled at that particular station. Or, a third condition may exist whereby the bag 10 may weigh over the tolerance set and therefore a small adjustment must be made to shift the auxiliary poise weight in an opposite direction so as to decrease the weight of the material a finite amount to the bag 10 which will next be filled at the numbered station. Assuming that bag 10 in station 7 is being weighed as shown in FIG. 1, the circuit connections for the three conditions may be explained using FIG. 3 and the block diagram of FIG. 1.

Assuming the first condition to exist, wherein bag 10 from station 7 is weighed and found to contain the correct weight of material within the set tolerances, no correction need be applied to the weight regulation system. Roller-conveyor scale 13 is not required to turn physically and reject the bag and therefore reject switch 15, which is connected to close upon the turning of conveyor scale 13, remains open as shown. Also, since neither an over or underweight data pulse is emitted by electronic selecting scale 14, neither of coils 21 or 22 in polar relay 20 are energized so as to activate polar relay armature 23 and therefore relay armature 23 retains its center position. The only closed circuits are those through commutator rings 26A–B and 27A–B. Tracing the circuit through ring 26A–B, there is a connection from a (+24 volts D.C.) source to commutator ring 26B, through commutator arm piece 28A to commutator ring 26A, segment 1, and then through the coil of relay 94 to a −24 volts D.C. source. The current through the coil of relay 94 closes the contacts of that relay (relay 94–1, connected to station 1). This closes the circuit between one side of a 110 volt A.C. source through the coil of relay 95 (relay 95–1, connected to station 1) to the opposite side of the 110 volt A.C. source. This closes the contacts of relay 95–1 which activates the filler valve 96 located at station 1 thereby allowing bag 10 at station 1 to be filled with a previously calculated amount of material. Tracing the other closed circuit which exists through commutator rings 27A–B, there is a connection from a +24 volts D. C. source to commutator ring 27B, through commutator arm piece 29A to commutator ring 27A, segment 3, and then through the coil of relay 91 to a −24 volts D.C. source. The contacts of relay 91 (relay 91–3, connected to station 3) are closed thereby connecting the coil of relay 92 (92–3, connected to station 3) across a 110 volt A.C. source. The contacts of relay 92–3 are then closed which activates a bag release mechanism 93. This allows the bag which has been filled at station 3 to be released and dropped on conveyor 11 for travel toward the scale to be checked and for final disposition.

If, instead, the second condition takes place, wherein the bag 10 from station 7 is weighed on roller-conveyor scale 13 and found to be below the weight tolerance set for the weight regulating system, the bag 10 is rejected by roller-conveyor scale 13. In this action, roller-conveyor scale 13 turns so as to place bag 10 on a conveyor for bags rejected as being underweight. This physical turning action causes the closing of reject switch 15. Also, electronic selecting scale 14 sends a data pulse to coil 22 of polar relay 20 causing relay armature 23 to move toward and make contact with polar relay contact 25. The closed circuits through commutator rings 26A–B and 27A–B discussed in connection with the first condition are also closed under the second condition now under discussion and act in the same manner so as to cause the bag 10 at station 1 to be filled and bag 10 at station 3 to be released onto conveyor 11. In addition the circuits connected through commutator rings 26C–D and 27C–D are closed and energized at this time. The data pulse from electronic selecting scale 14 denoting an underweight bag energizing polar relay coil 22 and making the contact between relay armature 23 and contact 25 completes the following circuit. The action in polar relay 20 closes the circuit from a −24 volts D.C. source through polar relay 20 to commutator ring 26D, through commutator bar piece 28B to commutator ring 26C, segment 1, which connects to terminal 51 of terminal board 50. Terminal 51 is connected to terminal 67 of the control relay 60 at station 7. The closed circuit continues at this station through control relay coil 72 and thence to terminal 68 which is connected to a +24 volts D.C. power source. The energizing of control relay coil 72 causes the control relay armatures 73, 74 and 75 to move toward the L contacts of control relay 60 at station 7.

At the same time, the physical turning of roller-conveyor scale 13 closes reject switch 15 and completes the circuit from a +24 volts D.C. source through closed reject switch 15 to commutator ring 27D, through commutator arm piece 29B to commutator ring 27C, segment 3 and to terminal 43 of terminal board 40. Terminal 43 of terminal board 40 is connected to terminal 70 of control relay 60 at station 7. The remaining terminals on terminal board 40 are connected to terminal 70 of the control relays 60 at the other stations as shown in FIG. 3. Only the control relay 60 at station 7 is activated in the cycling position for the position of the commutator arms 28 and 29 as shown. Terminal 70 is connected to the control relay armature 74 which under the condition for an underweight bag as discussed here will be to the left in contact with contact L. The circuit may then be traced to terminal 65 and to terminal 34 of reversible motor armature 35, through armature 35 and terminal 33, terminal 64, relay contact L and associated relay armature 75, terminal 71, terminal 32, reversible motor coil 36, terminal 31, terminal 69, control relay armature 73 and associated contact L, terminal 66, and limit switches 16 and 17 to a −24 volts D.C. source. Thus, by the positioning of control relay armatures 73, 74 and 75 toward contacts L by energization of control relay coil 72 through the action of polar relay 20, the connections are made to reversible motor 30 so as to cause it to run in a clockwise direction and move the auxiliary poise weight 84 to correct for the underweight condition.

In the third condition where bag 10, when weighed, is found to be overweight, the physical turning of roller-conveyor scale 13 again closes reject switch 15 and a data pulse from the electronic selecting scale 14 energizes coil 21 of polar relay 20 and causes armature 23 to make contact with contact 24. Since contact 24 is not connected to any source of current the circuit through polar relay 20 remains open and control relay coil 72 has no current through it. The control relay armatures 73, 74 and 75 thereby remain in their normal position which is in contact with the R contacts of control relay 60. The closing of reject switch 15 completes the circuit from a +24 volts D.C. source through reject switch 15, commutator ring 27D, commutator arm piece 29B, commutator ring 27C, segment 3, terminal 43 of terminal board 40, terminal 70 of control relay 60 at station 7, relay armature 74 and associated contact R, terminal 62, terminal 33, reversible motor armature 35, terminal 34, terminal 63, contact R and its associated relay armature 75, terminal 71, terminal 32, reversible motor coil 36, terminal 31, terminal 69, relay armature 73 and associated contact R, terminal 61, limit switches 17 and 16 to a −24 volts D.C. source. It should be noted that the direction of the D.C. current through reversible motor armature 35 has been reversed from the second or underweight condition described previously thereby causing the auxiliary poise weight 84 to move in an opposite direction so as to correct for the overweight bag under this condition.

In cases where the auxiliary poise weight 84 in FIG. 2 has been moved out of range on scale beam 86, limit switches 16 and 17, shown in FIGS. 2 and 3, open the circuit to the coil 36 of reversible motor 30 and thereby prevent damage to reduction gear 81, pinion 82, or rack 83. Where the auxiliary poise weight 84 has opened a limit switch by its overtravel, pushbutton non-locking switches 18 and 19 are connected so as to close the circuit to reversible motor 30 in the proper direction so as to regain control. Switches 18 and 19 are arranged so that one or the other controls the circuit—never both simultaneously. In addition, suitable fuses may be installed so as to open the circuit of the reversible motor 30 if an overload does occur.

Based on the system described in connection with the circuitry of FIG. 3, the following is a chart of the activity at each station during each of the cycling positions when eight segment commutator rings or equivalent cams are used:

| Cycling Position | Bag Filling at Station | Bag Releasing at Station | Bag Weighing from Station |
|---|---|---|---|
| 1 | 1 | 3 | 7 |
| 2 | 2 | 4 | 8 |
| 3 | 3 | 5 | 1 |
| 4 | 4 | 6 | 2 |
| 5 | 5 | 7 | 3 |
| 6 | 6 | 8 | 4 |
| 7 | 7 | 1 | 5 |
| 8 | 8 | 2 | 6 |

The commutator-segment method of securing the precise timing to the separate stations has been illustrated in connection with block and circuit diagrams of FIGS. 1 and 3. An alternate, and possibly a more easily adjustable method of mechanically securing this type of operation is through the use of cams. As shown in FIG. 4, an eight cam assembly, driven at the required r.p.m. through a motor 101, pinion gear 102 and driving gear 103, rotates in a clockwise direction. Each of eight cams 100 has two spring contacts 104, and two spring contacts 105 riding on the periphery of cam 100. Spring contacts 104 and spring contacts 105 are displaced 90° from each other, as shown in FIG. 5. Under each of spring contacts 104 and closed by its action, is an electrical contact 106. In the same manner electrical contacts 107 are located beneath each spring contact 105. The row of electrical contacts 106 are synonymous with its segment-commutator counterpart, commutator 27, and electrical contacts 107 with commutator 26. The closure of the cam contacts will exactly duplicate the position of the commutator arms 29 and 28.

Another embodiment of the weight regulation system of this invention does not make use of a scale beam as in FIG. 2, but instead regulates the weight of material to each bag through control of the time interval allowed for the material to flow. When a bag is found to be underweight, the flow time is increased and oppositely the flow time is decreased for the following bag at a station when the previous bag from that station is found to be overweight.

The circuitry of FIG. 3 may be used here but instead of reversible motor 30 being connected through reduction gear 81 to the scale beam device of FIG. 2, at each station the reversible motor 30 is connected through reduction gear 127 to potentiometer 126, shown in FIG. 6. The operation of this modification can be shown by an explanation of FIG. 6. An empty bag 10 is positioned below the spout of hopper 115 of bin 114. An operator's switch 112 is closed. Switch 112 is only a safety switch and has no part in the automatic operation of the system once it is closed and therefore may be omitted. Filler valve 96 is controlled by air cylinder 116 through application of control voltage to solenoid-operated air valve 111 which allows connection of the compressed air supply to one or the other of the hoses connected to air cylinder 116 thereby either opening or closing filler valve 96. The circuit controlling air valve 111 is traced from one side of the 110 volts A.C. power source through the coil of solenoid operated air valve 111 and through operator's switch 112 and the relay armature 118 and contact 118A back to the 110 volts A.C. power source. Relay armature 118 and its contacts 118A and 118B are located in electronic timer 110. Relay armature 118 and its contacts 118A and 118B are the controlling factors in that circuit as to the length of closed and open time of filler valve 96. Therefore, any variation in the time that relay armature 118 keeps the above circuit closed directly affects the time during which filler valve 96 is open for the flow of material downward from bin 114 to hopper 115 and then into bag 10. When the circuit is opened by relay armature 118, filler valve 96 returns to its normally closed position, since solenoid operated air valve 111 reverses air travel to air cylinder 116 moving a connecting rocker arm to close valve 96.

The control of the time interval during which filler valve 96 is open is determined by the remainder of the apparatus shown in FIG. 6. A pulsing cam 120 is driven at a constant r.p.m. by motor 121 via reduction gear 122 at a speed allowing the packing output of bags desired. Cam 120 has four cam indentations on the periphery of the cam bearing surface, equally spaced at ninety degrees separation, which cause momentary contact to be made between contacts 124 carried on spring 123. The contact spring 123, falling into the cam detents by spring action forces the contacts 124 together. Closing of contacts 124 commences the operation of timer 110 by closing the circuit of timer circuitry 125 thereby connecting a timer grid return to its cathode. This is not shown in detail, since it is a usual timer circuitry and other similar means could also be used. Closing of contacts 124 also causes coil 117 to pull relay armature 118 toward it thereby completing the circuit to operate filler valve 96 as explained previously. Filler valve 96 remains open until coil 119 receives current sufficient to cause relay armature 118 to be drawn toward it opening the circuitry controlling filler valve 96. This is governed by the combination of the electronic timer circuitry 125 and potentiometer 126. Potentiometer 126 is a resistance in the resistance-capacitance combination governing the electronic tube's operation within timer circuitry 125. The resistance-capacitance combination determines the time-period during which plate current flows in the timer tubes relay circuit. When relay armature 118 makes contact with contact 118A, it remains in that position until the proper resistance-capacitance combination allows the energization of coil 119. At that time the relay armature 118 moves toward coil 119 and opens the circuit of solenoid 111 thereby causing the closing of filler-valve 96.

Assume that a bag 10 previously filled at this station is weighed by the roller-conveyor scale 13 and companion electronic selecting scale 14 and found to be underweight. This is an indication that filler valve 96 was not opened for a period of time required to deposit the required amount of material during the filling cycle. To compensate for this time discrepancy, filler valve 96 must be kept open for a correspondingly longer period of time in order that the correct amount of material may be deposited in the bag being filled. Through polar relay 20 and control relay 60, as previously described in connection with FIG. 3, the reversible motor 30 operates through reduction gear 127 so as to rotate potentiometer 126 in a direction so as to increase the resistance. This operation of potentiometer 126 increases the resistance in electronic timer circuitry 125 resistance-capacitance control combination. The timer 110 circuitry is now set for a corrected time interval and awaits initiation through closing of contacts 124 through action of cam 120. Conversely, if the bag being weighed is overweight, reversible motor 30 turns in the opposite direction so as to rotate potentiometer 126 in a direction so as to decrease resistance and thereby decrease the resistance in the grid resistance-capacitance of timer circuitry 125. This results in a shorter open time for filler valve 96. The material flowing from hopper 115 has less time to be deposited in bag 10 so the final deposited weight is correspondingly less.

Limit switches 128 and 129 are likened to limit switches 16 and 17 for the auxiliary poise apparatus. These limit switches 128, 129 are actuated by a lug on the periphery of the shaft of potentiometer 126. This lug, when rotated in a counter-clockwise direction, opens switch 128, in a clockwise direction it opens switch 129. This opens the reversible motor 30 circuit preventing damage to the mechanism. Pushbutton non-locking reset switches, similar to switches 18 and 19 reverse the motor 30 when the lug has opened the circuit by overtravel either to the left or right. From the mechanism described in connection with FIG. 6, it is noted that by varying the amount of resistance in the electronic timer circuit concerned varying timed valve openings of filler valve 96 may be accomplished.

Figure 7:
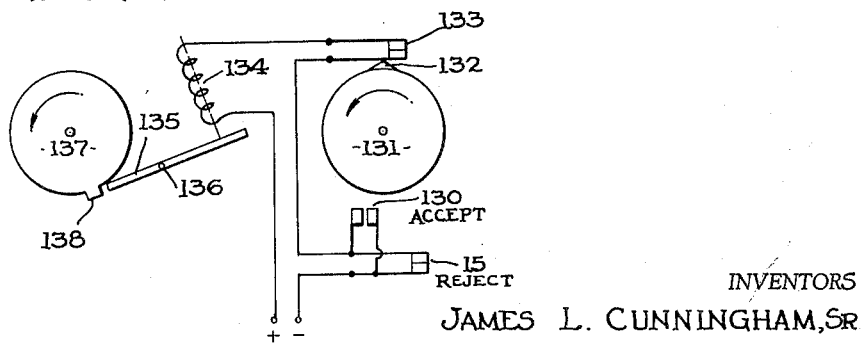
FIG. 7 is a part of the apparatus of the present invention for permitting smooth functioning without interference between the several bags passing through the filling mechanism.

In the operation of a multiple bag filler there is the possibility of collision between bags when bag from station 8 passes by station 1 which may then be in the process of releasing its bag. A mechanism to prevent such accidents is shown in FIG. 7. A cycling cam 131 is driven at a preset speed dependent on length of conveyor 11 and distance between stations 1 and 8. A raised point 132 on the periphery of cam 131 makes momentary contact with switch 133 closing its contacts. This switch 133 is in series with a control solenoid 134 and reject switch 15 paralleled with an accept switch 130. Reject switch 15 and accept switch 130 are controlled by the position of roller-conveyor scale 13. Switches 15 and 130 are connected in parallel, since the cycling through the various filling, releasing, and weighing sequences must continue whether the roller-conveyor scale 13 is in the "reject" or "accept" position. When switch 133 and either switches 15 or 130 are closed, the control solenoid 134 is energized and attracts stop arm 135 which turns on pivot point 136 so as to free lug 138 and allow the rotation of driven plate 137. Driven plate 137 is attached by a friction clutching arrangement (not shown) to the shaft upon which are mounted the rotating commutator arms 28 and 29. In the cam arrangement a mechanical clutch similar in operation to the above friction clutch would be necessary for installation in the shaft between pinion gear 102 and driven gear 103 of FIG. 4. This mechanical clutch would simply disengage the eight cam unit exactly as the friction clutch does for the segment commutator. After lug 138 has cleared stop arm 135, driven plate 137 turns through an entire 360° revolution before being blocked again by stop arm 135. The friction clutch driven segment commutator or similarly driven eight cam unit cannot commence another revolution when the lug 138 on driven plate 137 is again stopped by stop arm 135 until the cam operated switch 133 is again closed by cam 131. Cam 131 is made so as to have a longer operating time (less revolutions per minute) than driven plate 137 so as to give bag 10 from station 8, for example, ample time to clear station 1 before the bag 10 is released from that station. There is no change in material put into bags 10 by this arrangement, since the only portion of the entire operation which has been extended is the travel time for a bag along conveyor 11.

This problem may also be handled by use of a radial system of conveyors. With a system of radial conveyors there is no need for the delay mechanism of FIG. 7. The spout at each station fills a bag on the radial conveyor moving from the filling station to controlled conveyor 11 like the spokes on a wheel with the hub as the point of delivery to conveyor 11. The remaining functions are as previously described. There would be no need for a conveyor delay action because the delivery time of each radial conveyor would be equal since the distances would be equal from each filling station to the pick up point on conveyor 11.

By the present invention a production line of guaranteed-weight bags can be filled, with corrections made to bring the weight of succeeding bags within set tolerances and keep them there when necessary.

Additional embodiments of the invention in this specification will occur to those skilled in the art, and variations in matters of detail will be apparent; and therefore it is intended that the scope of the invention be limited only by the appended claims and not by the embodiments described hereinabove.

What is claimed is:

1. Apparatus for regulating the measured amounts of material fed into a series of containers one at a time comprising weighing means including signal means to indicate when the amount of material in any of the containers is over or underweight, a first relay means to differentiate between the over and underweight indications from said signal means, a plurality of stations at which containers receive the measured amounts of material, a rotating means for sending separate weight indications from any one given container to the one station with which that container is associated, each of said stations including a second relay means to receive weight indications from said first relay means, a reversible motor controlled by said second relay means, and means to control the amount of material fed into a container, said last mentioned means adjusted by the movement of said reversible motor.

2. The apparatus of claim 1, further characterized by said rotating means comprising a plurality of commutator rings, some of said commutator rings segmented into a number of parts equal in number to said plurality of stations, a plurality of commutator arm pieces, each of said commutator arm pieces in contact with one of said segmented commutator rings, and each segment of said segmented commutator rings electrically connected to one of said plurality of stations.

3. The apparatus of claim 1, further characterized by said rotating means comprising a rotatable shaft, a plurality of cams mounted on said shaft equal in number to said plurality of stations, two pairs of spring type contacts operated by each of said cams whereby circuitry to each of the plurality of stations is activated in turn.

4. Apparatus for regulating the measured amounts of material fed into a series of containers one at a time comprising weighing means including signal means to indicate when the amount of material in a container is over or underweight; a first relay means to differentiate between the over and underweight indications from said signal means; a plurality of stations at which containers receive the measured amounts of material; a rotating means for sending separate weight indications from any one given container to the one station with which that container is associated including a rotatable shaft, a plurality of cams mounted on said shaft equal in number to said plurality of stations, two pairs of spring type contacts operated by each of said cams, one of said pairs of spring type contacts positioned ninety degrees away from the other of said pair of contacts on the circumference of each of said cams; each of said stations including a second relay means to receive weight indications from said first relay means, a reversible motor controlled by said second relay means, and a means to control the amount of material fed into a container, said last mentioned means adjusted by the movement of said reversible motor.

5. Apparatus for regulating the measured amounts of material fed into a series of containers one at a time comprising weighing means including signal means to indicate when the amount of material in a container is over or underweight; a first relay means to differentiate between the over and underweight indications from said signal means; a plurality of stations at which containers receive measured amounts of material; a rotating means for sending separate weight indications from any one given container to the one station with which that container is associated; each of said stations including a second relay means to receive weight indications from said first relay means; a reversible motor controlled by said second relay means; and a means to control the amount of material fed into each container including a gear means connected to said reversible motor and moved thereby; a balance scale means to determine the weight of material fed to the container, and a weight on said balance scale means moved by said gear means to correct for an over or underweight indicated amount of material fed to a container.

6. Apparatus for regulating the measured amounts of material fed into a series of containers one at a time comprising weighing means including signal means to indicate when the amount of material in a container is over or underweight; a first relay means to differentiate between the over and underweight indications from said signal means; a plurality of stations at which containers receive measured amounts of material; a rotating means for sending separate weight indications from any one given container to the one station with which that container is associated comprising a plurality of commutator rings, some of said commutator rings segmented into a number of parts equal in number to said plurality of stations, a plurality of commutator arm pieces, each of said commutator arm pieces in contact with one of said segmented commutator rings, and each segment of said segmented commutator rings electrically connected to one of said plurality of stations; each of said stations including a second relay means to receive weight indications from said first relay means, a reversible motor controlled by said second relay means, and a means to control the amount of material fed into each container including a gear means connected to said reversible motor and moved thereby, a balance scale means to determine the weight of material fed to the container, and a weight on said balance scale means moved by said gear means to correct for an over or underweight indicated amount of material fed to a container.

7. Apparatus for regulating the measured amounts of material fed into a series of containers one at a time comprising weighing means including signal means to indicate when the amount of material in a container is over or underweight; a first relay means to differentiate between the over and underweight indications from said signal means; a plurality of stations at which containers receive measured amounts of material; a rotating means for sending separate weight indications from any one given container to the one station with which that container is associated including a rotatable shaft, a plurality of cams mounted on said shaft equal in number to said plurality of stations, two pairs of spring type contacts operated by each of said cams, and one of said pairs of spring type contacts positioned ninety degrees away from the other of said pair of contacts on the circumference of each of said cams; each of said stations including a second relay means to receive weight indications from said first relay means, a reversible motor controlled by said second relay means, and a means to control the amount of material fed into each container including a gear means connected to said reversible motor and moved thereby, a balance scale means to determine the weight of material fed to the container, and a weight on said balance scale means moved by said gear means to correct for an over or underweight indicated amount of material fed to a container.

8. Apparatus for regulating the measured amounts of material fed into a series of containers one at a time comprising weighing means including signal means to indicate when the amount of material in a container is over or underweight; a first relay means to differentiate between the over and underweight indications from said signal means; a plurality of stations at which containers receive measured amounts of material; a rotating means for sending separate weight indications from any one given container to the one station with which that container is associated comprising a plurality of commutator rings, some of said commutator rings segmented into a number of parts equal in number to said plurality of stations, a plurality of commutator arm pieces, each of said commutator arm pieces in contact with one of said segmented commutator rings, and each segment of said segmented commutator rings electrically connected to one of said plurality of stations; each of said stations including a second relay means to receive weight indications from said first relay means, a reversible motor controlled by said second relay means, and a means to control the amount of material fed into each container comprising a reduction gear means connected to said reversible motor and moved thereby, an electronic timing means for controlling the length of the time interval during which material flows into a container, a pulsing cam to trigger the operation of said timing means, a motor to rotate said pulsing cam, and a variable resistance connected into said timing means whereby said timing means is adjusted to change the time interval during which material flows.

9. Apparatus for regulating the measured amounts of material fed into a series of containers one at a time comprising weighing means including signal means to indicate when the amount of material in a container is over or underweight; a first relay means to differentiate between the over and underweight indications from said signal means; a plurality of stations at which containers receive measured amounts of material; a rotating means for sending separate weight indications from any one given container to the one station with which that container is associated including a rotatable shaft, a plurality of cams mounted on said shaft equal in number to said plurality of stations, two pairs of spring type contacts operated by each of said cams, and one of said pairs of spring type contacts positioned ninety degrees away from the other of said pair of contacts on the circumference of each of said cams; each of said stations including a second relay means to receive weight indications from said first relay means, a reversible motor controlled by said second relay means, and a means to control the amount of material fed into each container comprising a reduction gear means connected to said reversible motor and moved thereby, an electronic timing means for controlling the length of the time interval during which material flows into a container, a pulsing cam to trigger the operation of said timing means, a motor to rotate said pulsing cam, and a variable resistance connected into said timing means whereby said timing means is adjusted to change the time interval during which material flows.

10. Apparatus for regulating the measured amounts of material fed into a series of containers one at a time comprising weighing means including signal means to indicate when the amount of material in any of the containers is over or underweight, a first relay means to differentiate between the over and underweight indications from said signal means, a plurality of stations at which containers receive the measured amounts of material, a rotating means for sending separate weight indications from any one given container to the one station with which that container is associated, each of said stations including a second relay means to receive weight indications from said first relay means, a reversible motor controlled by said second relay means, means to control the amount of material fed into a container, said last mentioned means adjusted by the movement of said reversible motor, a cycling cam to prevent containers from each of said plurality of stations from interfering with each other, a first switch closed by said cycling cam once during each complete revolution of said cycling cam, a second switch on said weighing means closed by said weighing means, a solenoid coil energized at the closing of said first and second switches, a second cam attached to and driving said rotating means, a lug located on said second cam, a pivoted stop arm which contacts said lug and stops the motion of said second cam until the opposite end of said pivoted stop arm is attracted toward said solenoid coil by electromagnetic action.

11. Apparatus for regulating the measured amounts of material fed into a series of containers one at a time comprising weighing means including signal means to indicate when the amount of material in a container is over or underweight; a first relay means to differentiate between the over and underweight indications from said signal means; a plurality of stations at which containers receive measured amounts of material; a rotating means for sending separate weight indications from any one given container to the one station with which that container is associated; each of said stations including a second relay means to receive weight indications from said first relay means, a reversible motor controlled by said second relay means; and a means to control the amount of material fed into each container including a gear means connected to said reversible motor and moved thereby, a balance scale means to determine the weight of material fed to the container, a weight on said balance scale means moved by said gear means to correct for an over or underweight indicated amount of material fed to a container, a pair of limit switches located so as to contact said weight at the extreme ends of its path of travel, and switching means to bypass said limit switches in order to return said reversible motor to within the limits set by said limit switches.

12. Apparatus for regulating the measured amounts of material fed into a series of containers one at a time comprising weighing means including signal means to indicate when the amount of material in any of the containers is over or underweight, a first relay means to differentiate between the over and underweight indications from said signal means, a plurality of stations at which containers receive the measured amounts of material, a rotating means for sending separate weight indications from any one given container to the one station with which that container is associated, each of said stations including a second relay means to receive weight indications from said first relay means, a reversible motor controlled by said second relay means, means to control the amount of material fed into a container, said last mentioned means adjusted by the movement of said reversible motor, and conveyor means to carry the containers from each of said stations to said weighing means in preset ordered relationship to each other.

13. The apparatus of claim 12, further characterized by said conveyor means extending as radial conveyors from a central point to each of said plurality of stations, and a feed conveyor at said central point which carries containers from said central point to said weighing means.

14. Apparatus for regulating the measured amounts of material fed into a series of containers one at a time comprising weighing means including signal means to indicate when the amount of material in any of the containers is over or underweight, a reject switch associated with said weighing means, said reject switch closing whenever said weighing means detects over or underweight, a first relay means to differentiate between the over and underweight indications from said signal means, a plurality of stations at which containers receive measured amounts of material, a rotating means to activate each of said plurality of stations in turn, each of said stations including a second relay means to receive weight indications from said first relay means, a reversible motor controlled by said second relay means, means to control the amount of material fed into a container adjusted by said reversible motor at each station, a third relay means and a fourth relay means operated through said rotating means, a filler valve activated by said third relay means, a release valve activated by said fourth relay means, and a conveyor means to carry the container placed thereon after said release valve has been activated, said conveyor means moving a container from said station to said weighing means.

15. Apparatus for regulating the amount of material fed into containers comprising weighing means including signal means to indicate when the amount of material in a container is over or underweight, a first relay means to differentiate between the over and underweight indications from said signal means, a second relay means to receive weight indications from said first relay, a reversible motor controlled by said second relay, and a means to control the amount of material fed into a container, said last mentioned means adjusted by the movement of said reversible motor and comprising a gear means connected to said reversible motor, and moved thereby, a balance scale means to determine the weight of material fed to a container, and a weight on said balance scale means moved by said gear means to correct for an over or underweight amount of material fed to a container.

16. Apparatus for regulating the amount of material fed into containers comprising weighing means including signal means to indicate when the amount of material in a container is over or underweight, a first relay means to differentiate between the over and underweight indications from said signal means, a second relay means to receive weight indications from said first relay, a reversible motor controlled by said second relay, and a means to control the amount of material fed into a container, said last mentioned means adjusted by the movement of said reversible motor and comprising a reduction gearing to reduce the speed of the reversible motor output, a balance scale means to determine the weight of material fed to the container, said balance scale means including a rack and pinion gear operated by said reduction gearing, and a weight moved by said rack and pinion gear to correct for an over or underweight amount of material fed to the container.

17. Apparatus for regulating the amount of material fed into containers comprising weighing means including signal means to indicate when the amount of material in a container is over or underweight, a first relay means to differentiate between the over and underweight indications from said signal means, a second relay means to receive weight indications from said first relay, a reversible motor controlled by said second relay, means to control the amount of material fed into a container, said last mentioned means adjusted by the movement of said reversible motor, and including a reduction gear means connected to said reversible motor and moved thereby, an electronic timing means for controlling the length of the time interval during which material flows into a container, a pulsing cam to trigger the operation of said timing means, a motor to rotate said pulsing cam, and a variable resistance connected into said timing means whereby said timing means is adjusted to change the time interval during which material flows.

References Cited in the file of this patent

UNITED STATES PATENTS

| | | |
|---|---|---|
| 2,067,743 | Weckerly | Jan. 12, 1937 |
| 2,712,408 | Weber | June 5, 1955 |
| 2,755,007 | Knobel | July 17, 1956 |
| 2,901,209 | Bardy et al. | Aug. 25, 1959 |
| 2,961,096 | Hecox et al. | Nov. 22, 1960 |
| 2,966,989 | Esken | Jan. 3, 1961 |